(12) United States Patent
Veregin et al.

(10) Patent No.: US 12,681,400 B2
(45) Date of Patent: *Jul. 14, 2026

(54) TONER COMPOSITIONS AND ADDITIVES

(71) Applicant: Xerox Corporation, Norwalk, CT (US)

(72) Inventors: Richard Philip Nelson Veregin, Mississauga (CA); Kimberly D. Nosella, Ancaster (CA); Raysa Rodriguez Diaz, Burlington (CA); Melanie Lynn Davis, Hamilton (CA); Cuong Vong, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 638 days.

This patent is subject to a terminal disclaimer.

(21) Appl. No.: 17/476,933

(22) Filed: Sep. 16, 2021

(65) Prior Publication Data

US 2023/0097294 A1 Mar. 30, 2023

(51) Int. Cl.
G03G 9/08 (2006.01)
G03G 9/087 (2006.01)
G03G 9/097 (2006.01)
B82Y 40/00 (2011.01)

(52) U.S. Cl.
CPC ......... G03G 9/0872 (2013.01); G03G 9/0819 (2013.01); G03G 9/09733 (2013.01); B82Y 40/00 (2013.01)

(58) Field of Classification Search
CPC .............. G03G 9/0872; G03G 9/0819; G03G 9/09733; B82Y 40/00
See application file for complete search history.

(56) References Cited

U.S. PATENT DOCUMENTS

| | | | |
|---|---|---|---|
| 4,154,621 A | 5/1979 | Burke, Jr. et al. | |
| 4,761,358 A * | 8/1988 | Hosoi ................ | G03G 9/09378 428/402.22 |
| 5,445,910 A * | 8/1995 | Ishikawa ............ | G03G 9/08791 430/108.11 |

(Continued)

FOREIGN PATENT DOCUMENTS

| JP | 2006163187 A | 6/2006 |
|---|---|---|

OTHER PUBLICATIONS

Vogt, C. (Authorized Officer), Extended European Search Report for European Application No. 22192994.6 dated Jan. 18, 2023, 7 pages.

(Continued)

*Primary Examiner* — Mark F. Huff
*Assistant Examiner* — Charles Collins Sullivan, IV
(74) *Attorney, Agent, or Firm* — MH2 Technology Law Group LLP

(57) ABSTRACT

Disclosed herein is a toner composition, developer and additive for a toner composition. The toner composition includes toner particles comprising at least one resin, an optional colorant, an optional wax, and a polymeric toner additive on at least a portion of an external surface of the toner particles. The polymeric toner additive includes a polymeric resin comprising a cross-linked fluorinated acrylic monomer, a cross-linkable monomer containing two or more vinyl groups at 8 wt % to 40 wt % of the polymeric resin, and optionally a charge control agent comprising nitrogen containing group at 0.1 wt % to 1.5 wt % of the polymeric resin.

13 Claims, 3 Drawing Sheets

(56) References Cited

U.S. PATENT DOCUMENTS

| | | | |
|---|---|---|---|
| 6,455,219 B1 | 9/2002 | Chen et al. | |
| 6,818,679 B2 | 11/2004 | Fukushima et al. | |
| 8,663,886 B2 | 3/2014 | Vanbesien et al. | |
| 9,568,847 B2 | 2/2017 | Fomitchev et al. | |
| 9,926,398 B2 | 3/2018 | Zhang et al. | |
| 10,358,557 B1 | 7/2019 | Veregin et al. | |
| 10,725,394 B1 * | 7/2020 | Veregin | G03G 9/09321 |
| 2003/0198886 A1 * | 10/2003 | Chen | G03G 9/09791 |
| | | | 430/137.11 |
| 2009/0246682 A1 | 10/2009 | Hara et al. | |
| 2009/0311618 A1 | 12/2009 | Lee et al. | |
| 2012/0156605 A1 * | 6/2012 | Vanbesien | G03G 9/09733 |
| | | | 430/108.2 |
| 2017/0090314 A1 | 3/2017 | Veregin et al. | |
| 2017/0115588 A1 | 4/2017 | Fomitchev et al. | |
| 2020/0308328 A1 | 10/2020 | Veregin et al. | |
| 2020/0310268 A1 | 10/2020 | Veregin et al. | |
| 2022/0137524 A1 | 5/2022 | Veregin et al. | |
| 2022/0137526 A1 | 5/2022 | Veregin et al. | |
| 2022/0308487 A1 | 9/2022 | Veregin et al. | |

OTHER PUBLICATIONS

Thermo Fisher Scientific, Safety Data Sheet, Product Description: Divinylbenzene, 80%, mixture of isomers, stabilized with 1000ppm 4-tert-butylcatechol, Revision No. 2, ALFAA42804, Dec. 27, 2020, 13 pages.

U.S. Appl. No. 17/086,519 Office Action dated Sep. 30, 2021, 12 pages.

U.S. Appl. No. 17/086,516, Final Office Action dated Dec. 21, 2021, 16 pages.

"Toner Compositions and Additives" application filed Nov. 2, 2020, 51 pages.

"Toner Compositions and Additives" application filed Nov. 2, 2020, 50 pages.

U.S. Appl. No. 17/086,516, Office Action dated Aug. 30, 2021, 11 pages.

U.S. Appl. No. 17/086,519 Final Office Action dated Feb. 22, 2022, 13 pages.

U.S. Appl. No. 17/086,516, Notice of Allowance dated Apr. 27, 2022, 11 pages.

* cited by examiner

*FIG. 2*

TONER COMPOSITIONS AND ADDITIVES

BACKGROUND

Field of Use

The present disclosure is generally directed to toner compositions, and more specifically, to toner compositions including polymeric additives.

Background

Electrophotographic printing utilizes toner particles which may be produced by a variety of processes. One such process includes an emulsion aggregation ("EA") process that forms toner particles in which surfactants are used in forming a latex emulsion. See, for example, U.S. Pat. No. 6,120,967, the disclosure of which is hereby incorporated by reference in its entirety, as one example of such a process.

Combinations of amorphous and crystalline polyesters may be used in the EA process. This resin combination may provide toners with high gloss and relatively low-melting point characteristics (sometimes referred to as low-melt, ultra low melt, or ULM), which allows for more energy efficient and faster printing. The use of additives with EA toner particles may be important in realizing optimal toner performance, especially in the area of charging.

Issues which may arise with toners include their sensitivity to environmental conditions, including humidity. For example, in the summer months, when it is hot and humid, deterioration of the image background may occur. In the winter months, when it is cold and dry, deterioration of light images may occur. There may also be a decrease in charge with developer aging, leading to excessive background.

There is a need for a toner formulation that reduces cost and maintains the performance of current additives with equal or better RH sensitivity, and equal or better blocking.

SUMMARY

According to various embodiments, there is provided a toner composition. The toner composition includes toner particles comprising at least one resin, an optional colorant, an optional wax, and a polymeric toner additive on at least a portion of an external surface of the toner particles. The polymeric toner additive includes a polymeric resin comprising a cross-linked fluorinated acrylic monomer, a cross-linkable monomer containing two or more vinyl groups at 8 wt % to 40 wt % of the polymeric resin, and optionally a charge control agent comprising nitrogen containing group at 0.1 wt % to 1.5 wt % of the polymeric resin.

According to various embodiments, there is provided a developer including a toner composition and a toner carrier. The toner composition includes toner particles comprising at least one resin, an optional colorant, an optional wax, and a polymeric toner additive on at least a portion of an external surface of the toner particles. The polymeric toner additive includes a polymeric resin comprising a cross-linked fluorinated acrylic monomer, a cross-linkable monomer containing two or more vinyl groups at 8 wt % to 40 wt % of the polymeric resin, and optionally a charge control agent monomer comprised of a nitrogen containing group at 0.1 wt % to 1.5 wt % of the polymeric resin.

Disclosed herein is a toner additive that includes a polymeric resin comprising a cross-linked fluorinated acrylic monomer, a cross-linkable monomer containing two or more vinyl groups at 8 wt % to 40 wt % of the polymeric resin, and optionally a charge control agent of a nitrogen containing group at 0.1 wt % to 1.5 wt % of the polymeric resin.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 2 shows admix performance versus time according to various embodiments disclosed herein.

Figure 1:
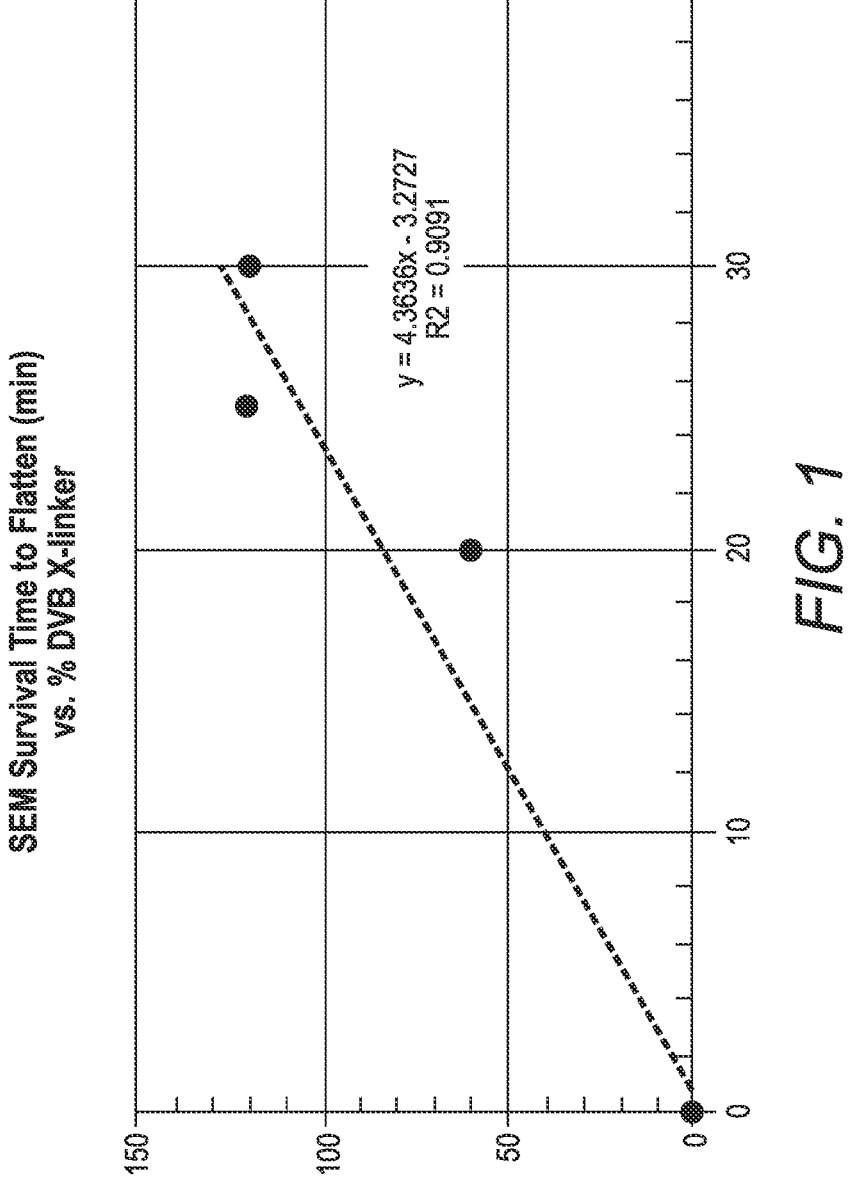
FIG. 1 shows survival time to flattening according to various embodiments disclosed herein.

It should be noted that some details of the drawings have been simplified and are drawn to facilitate understanding of the embodiments rather than to maintain strict structural accuracy, detail, and scale.

DETAILED DESCRIPTION OF THE EMBODIMENTS

The present disclosure provides polymeric additives for use with toner particles.

The resulting polymer may be used as an additive with toner compositions, providing the resulting toner with enhanced sensitivity to relative humidity and charge stability. The polymeric additives of the present disclosure may be used at a lower density in terms of specific gravity compared with other additives, so that much less material by weight is required for equivalent surface area coverage, compared to inorganic additives, including oxides such as titania and silica. The polymeric additives of the present disclosure may also provide toner particles with a wide range of properties including hydrophobicity and charge control, depending on the monomers used in the formation of the polymers. The polymeric additives of the present disclosure reduce cost and meet regulatory requirements.

In embodiments, the toner composition includes toner particles of at least one resin. The toner composition may include an optional colorant. The toner composition may include an optional wax. The toner composition includes a polymeric toner additive on at least a portion of an external surface of the toner particles. The polymeric toner additive includes a polymeric resin comprising a cross-linked fluorinated acrylic monomer, a cross-linkable monomer containing two or more vinyl groups at 8 wt % to 40 wt % of the polymeric resin, and optionally a charge control agent monomer comprised of a nitrogen containing group at 0.1 wt % to 1.5 wt % of the polymeric resin. The polymeric toner additive has a size of from 20 nanometers to about 250 nanometers. The loading of the polymeric toner additive is from 0.1 weight percent to 5 weight percent of the toner composition.

Suitable fluorinated acrylic monomers which may be utilized in forming the polymer additive include, for example, 2,4,6-trifluorophenyl acrylate, pentafluorophenyl acrylate, hexafluoro-iso-propyl methacrylate, 1H,1H,3H-hexafluorobutyl methacrylate, 2,2,2-trifluoroethyl acrylate, 2,2,2-trifluoroethyl methacrylate, 1H,1H,2H,2H-heptadecafluorodecyl methacrylate (HDFDMA), 1H,1H,5H-octafluoropentyl methacrylate, 2,2,3,3,4,4,5,5,6,6,7,7-dodecafluoroheptyl acrylate, 3,3,4,4,5,5,6,6,7,7,8,8,9,9,10,10,11, 11,12,12,12-heneicosafluorododecyl acrylate, 3,3,4,4,5,5,6,

3

6,7,7,8,8,9,9,10,10,10-heptadecafluorodecyl methacrylate, 2,2,3,3,4,4,4-heptafluorobutyl acrylate, 2,2,3,3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate, 2,2,3,3,4,4,5,5-octafluoropentyl methacrylate, 2,2,3,3,3-pentafluoropropyl acrylate, 2,2,3,3,3-pentafluoropropyl methacrylate, 1H,1H,2H,2H-perfluorodecyl acrylate, 2,2,3,3-tetrafluoropropyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 2,2,2-trifluoroethyl methacrylate, 2-[(1',1',1'-trifluoro-2'-(trifluoromethyl)-2'-hydroxy)propyl]-3-norbornyl methacrylate, perfluorocyclohexyl (meth)acrylate or any combinations thereof and the like.

The polymeric additive may also include a cross-linkable monomer possessing at least two vinyl groups. Suitable monomers having at least two vinyl groups for use in the polymeric additive include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, or any combinations thereof, and the like. In embodiments, the crosslinking agent may be fluorinated. Suitable fluorinated crosslinking agents include fluorinated divinyl crosslinking agents, such as 1,8-divinyl perfluoro (octane), 1,6-divinyl perfluoro(hexane) and 1,4-divinyl perfluoro(butane).

The fluorinated acrylic monomer may be present in the polymeric additive in an amount of from about 5% by weight of the copolymer to about 100% by weight of the polymeric additive, in embodiments from about 20% by weight of the polymeric additive to about 92% by weight of the polymeric additive.

The cross-linkable monomer possessing at least two vinyl groups may be present in such a polymeric additive in an amount of from about 8.0% by weight of the polymeric additive to about 40% by weight of the polymeric additive, in embodiments from about 10% by weight of the copolymer to about 25% by weight of the polymeric additive.

In embodiments a charge control agent monomer including a nitrogen containing group, may include but is not limited to, dimethylaminoethyl methacrylate, diethylaminoethyl methacrylate, dipropylaminoethyl methacrylate, diisopropylaminoethyl methacrylate, dibutylaminoethyl methacrylate, or any combinations thereof.

The charge control agent monomer including a nitrogen containing group in the polymeric additive is from 0.1 wt % to 1.5 wt % of the polymeric additive, about 0.6 wt % to 1.2 wt %, or about 0.7 wt % to about 1.1 wt % of the polymeric additive.

Methods for forming the polymeric additive include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion, which may then be recovered and used as the polymeric additive for a toner composition.

Where utilized, suitable solvents may include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, a latex for forming the polymeric additive may be prepared in an aqueous phase containing a surfactant or co-surfactant, optionally under an inert gas such as nitrogen. Surfactants which may be utilized with the resin to form a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS) also known as sodium lauryl sulfate (SLS), sodium dodecylbenzene sulfonate, sodium dodecylnaphthalene sulfate, dialkyl benzenealkyl sulfates and sulfonates, acids such as abietic acid available from Aldrich, NEOGEN™, NEOGEN SC™ obtained from Daiichi Kogyo Seiyaku Co., Ltd., combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$, $C_{15}$, $C_{17}$ trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof, and the like. In embodiments commercially available surfactants from Rhone-Poulenc such as IGEPAL CA-210™, IGEPAL CA-520™ IGEPAL CA-720™, IGEPAL CO-890™, IGEPAL CO-720™, IGEPAL CO-290™, IGEPAL CA-210™, ANTAROX 890™ and ANTAROX 897™ can be utilized.

The surfactants or combinations thereof, as well as the amounts of each to be used, are within the purview of those skilled in the art.

In embodiments, initiators may be added for formation of the latex utilized in formation of the polymeric additive. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methyl-propionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2' azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, and in embodiments from about 0.2 to about 5 weight percent of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., in embodiments from about 20° C. to about 90° C., in other embodiments from about 45° C. to about 75° C.

Those skilled in the art will recognize that optimization of reaction conditions, temperature and initiator loading can be varied to generate polymers of various molecular weights, and that structurally related starting materials may be polymerized using comparable techniques.

The resulting latex, possessing the polymeric additive of the present disclosure, may be applied to toner particles utilizing any means within the purview of one skilled in the art. In embodiments, the toner particles may be dipped in or sprayed with the latex including the polymeric additive, thus becoming coated therewith, and the coated particles may then be dried to leave the polymeric coating thereon.

In other embodiments, once the polymeric additive for a toner has been formed, it may be recovered from the latex by any technique within the purview of those skilled in the art, including filtration, drying, centrifugation, spray drying, combinations thereof, and the like.

In embodiments, once obtained, the copolymer utilized as the additive for a toner may be dried to powder form by any method within the purview of those skilled in the art, including, for example, freeze drying, optionally in a vacuum, spray drying, combinations thereof, and the like. The dried polymeric additive of the present disclosure may then be applied to toner particles utilizing any means within the purview of those skilled in the art, including, but not limited to, mechanical impaction and/or electrostatic attraction. An example of mechanical mixing equipment includes the Henschel FM high intensity mixers from Zeppelin Systems, though other mixing equipment may also be used in embodiments.

Particles of the copolymer may have an average or medium particle size (D50) of from about 20 nanometers to about 250 nanometers in diameter, in embodiments from about 40 nanometers to about 150 nanometers in diameter. Particle size of suspended particles ranging in size from 0.0008 to 6.54 microns are measured using the Nanotrac 252 instrument. This instrument uses a laser light-scattering technique, Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber. As used herein, the term "D50" refers to a diameter at which 50% of the sample (on a volume basis unless otherwise specified) is comprised of particles having a diameter less than said diameter value. D50 may also be referred to as the "average particle size." For light scattering techniques, NIST polystyrene Nanosphere control samples with a diameter within the range of 15 mm to 150 mm under the tradename NIST Traceable Reference Material for Nanotrac Particle Size Analyzers obtained from Microtrac may be used.

The copolymers utilized as the polymeric additive, which, in embodiments, may be soluble in solvents such as tetrahydrofuran (THF), may have a number average molecular weight (M), as measured by gel permeation chromatography (GPC) of, for example, from about 40,000 to about 280,000 Daltons, in embodiments from about 60,000 to about 170,000 Daltons, and a weight average molecular weight ($M_w$) of, for example, from about 200,000 to about 800,000 Daltons, in embodiments from about 400,000 to about 600,000 Daltons, as determined by Gel Permeation Chromatography using polystyrene standards. In embodiments, due to the cross-linking it may not be possible to measure a molecular weight by any method, due to the limited solubility of the cross-linked resin.

The copolymers utilized as the polymeric additive may have a glass transition temperature (Tg) of from about 85° C. to about 140° C., in embodiments from about 100° C. to about 130° C. In embodiments, it may not be possible to determine a Tg due to the resin cross-linking, which can make a Tg difficult to detect. In embodiments, A-zone charge of a toner including the polymeric additive of the present disclosure may be from about −15 to about −80 microcolombs per gram, in embodiments from about −20 to about −60 microcolombs per gram, while J-zone charge of a toner including the polymeric additive of the present disclosure may be from about −15 to about −80 microcolombs per gram, in embodiments from about −20 to about −60 microcolombs per gram.

The polymeric additive of the present disclosure may be combined with toner particles so that the polymeric additive is present in an amount of from about 0.1% by weight of the toner particles to about 5% by weight of the toner particles, in embodiments from about 0.2% by weight of the toner particles to about 2% by weight of the toner particles.

Thus, with the polymeric additive compositions and processes of the present disclosure, there can be formulated developers with selected high triboelectric charging characteristics and/or conductivity values utilizing a number of different combinations.

Toners

The polymeric additives thus produced may then be combined with toner resins, optionally possessing colorants, to form a toner of the present disclosure.

Resins

Any toner resin may be utilized in forming a toner of the present disclosure. Such resins, in turn, may be made of any suitable monomer or monomers via any suitable polymerco-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

(I)

ization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various glass transition temperatures of, for example, from about 30° C. to about 80° C., in embodiments from about 35° C. to about 75° C. As used herein, the low molecular weight amorphous polyester resin has, for example, a number average molecular weight (M), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight ($M_w$) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution ($M_w/M_n$) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly(co-propoxylated bisphenol A co-ethoxylated bisphenol A wherein R may be hydrogen or a methyl group, and m and n represent random units of the copolymer and m may be from about 2 to 10, and n may be from about 2 to 10. Examples of such resins and processes for their production include those disclosed in U.S. Pat. No. 6,063,827, the disclosure of which is hereby incorporated by reference in its entirety.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-isophthalate, polypropylene-isophthalate, polybutylene-isophthalate, polypentylene-isophthalate, polyhexylene-isophthalate, polyheptadene-isophthalate, polyoctalene-isophthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(ethoxylated bisphenol A-fumarate), poly(ethoxylated bisphenol A-succinate), poly(ethoxylated bisphenol A-adipate), poly(ethoxylated bisphenol A-glutarate), poly(ethoxylated bisphenol A-terephthalate), poly(ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly(propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL (Reichhold Inc), ARAKOTE (Ciba-Geigy Corporation), HET- RON (Ashland Chemical), PARAPLEX (Rohm & Haas), POLYLITE (Reichhold Inc), PLASTHALL (Rohm & Haas), CYGAL (American Cyanamide), ARMCO (Armco Composites), ARPOL (Ashland Chemical), CELANEX (Celanese Eng), RYNITE (DuPont), STYPOL (Freeman Chemical Corporation) and combinations thereof. The resins can also be functionalized, such as carboxylated, sulfonated, or the like, and particularly such as sodio sulfonated, if desired.

Examples of suitable polycondensation catalyst for either the low molecular weight amorphous polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins.

The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature (Tg) of, for example, from about 30° C. to about 80° C., in embodiments from about 35° C. to about 70° C. as measured by DSC. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight (M), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The molecular weight distribution ($M_w/M_n$) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

The crystalline resin may be prepared by a polycondensation process by reacting suitable organic diol(s) and suitable organic diacid(s) in the presence of a polycondensation catalyst.

Examples of organic diols selected for the preparation of crystalline polyester resins include aliphatic diols with from about 2 to about 36 carbon atoms.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof, and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

In embodiments, a suitable crystalline resin may include a resin composed of ethylene glycol or nonanediol and a mixture of dodecanedioic acid and fumaric acid co-monomers with the following formula (II):

$$(II)$$

wherein b is from about 5 to about 2000 and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight (M), as measured by gel permeation chromatography (GPC) of, for example, from about 1,000 to about 10,000. The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

In embodiments, cross-linked polyesters resins may be made from linear amorphous polyester resins that contain sites of unsaturation that can react under free-radical conditions. In embodiments, suitable unsaturated polyester base resins may be prepared from diacids and/or anhydrides such as, for example, maleic anhydride, terephthalic acid, trimellitic acid, fumaric acid, and the like, and combinations thereof, and diols such as, for example, bisphenol-A ethyleneoxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Examples of such polyesters and methods for their synthesis include those disclosed in U.S. Pat. No. 6,592,913, the disclosure of which is hereby incorporated by reference in its entirety.

Suitable polyols may contain from about 2 to about 100 carbon atoms and have at least two or more hydroxy groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% weight of the reaction mixture, in embodiments, from about 22% to about 26% weight of the reaction mixture.

In embodiments, the cross-linked branched polyesters for the high molecular weight amorphous polyester resin may include those resulting from the reaction of dimethyltereph-thalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

Surfactants

In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include those mentioned previously. Examples of the cationic surfactants include those mentioned previously.

Colorants

The latex particles produced as described above may be added to a colorant to produce a toner. In embodiments, the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Wax

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes, plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate Toner Preparation The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302, 486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 1000 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

Shell Resin

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example, free radical or thermal initiators such as organic peroxides and azo compounds described above as suitable for forming a gel in the core.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 rpm to about 400 rpm, in embodiments from about 200 rpm to about 300 rpm. The fused particles can be measured for shape factor or circularity, such as with a SYSMEX FPIA 2100 analyzer, until the desired shape is achieved.

Coalescence may be accomplished over a period from about 0.01 to about 9 hours, in embodiments from about 0.1 to about 4 hours.

Subsequent Treatments

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

The toner slurry may then be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out by any method within the purview of one skilled in the art. Any suitable method of drying toner particles may be used, including freeze drying, spray drying and flash drying such as an Aljet dryer. The drying may be continued until the moisture level of the particles is below a set target of about 1% by weight, in embodiments of less than about 0.7% by weight.

Additives

In embodiments, toner particles may contain the polymeric additive of the present disclosure described above, as well as other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

Each of these external additives may be present in an amount from about 0 weight percent to about 3 weight percent of the toner, in embodiments from about 0.25 weight percent to about 2.5 weight percent of the toner, although the amount of additives can be outside of these ranges. In embodiments, the toners may include, for example, from about 0 weight percent to about 3 weight percent titania, from about 0 weight percent to about 3 weight percent silica, and from about 0 weight percent to about 3 weight percent zinc stearate.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

In embodiments, suitable carriers may include a steel core, for example of from about 25 to about 100 μm in size, in embodiments from about 50 to about 75 μm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations may be from about 1% to about 20% by weight of the toner composition. However, different toner and carrier percentages may be used to achieve a developer composition with desired characteristics.

Imaging

The toners can be utilized for electrostatographic or electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLES

Fluorinated Additive Latex Preparation.

The fluorinated organic additive latex used here were all prepared at 2 L bench scale. A number of latexes were used in this current reduction to practice. All the latexes were made with the same general process and formulation loadings, except changing monomer ratios.

The fluorinated organic additive latex used here were all prepared at 2 L bench scale. A number of latexes were used in this current reduction to practice. All the latexes were made with the same general process and formulation loadings, except changing monomer ratios. Details are shown in Table 1 below.

Additive 1: Synthesis of Fluorinated Organic Additive Latex Trifluoroethyl Methacrylate (RR-TFEMA-02) with 0% Divinyl Benzene (DVB)

In a 2 L buchi reactor, equipped with a P4 type impeller, 6.5 g of SLS surfactant (at 30% solids) was added to 816 g of deionized water (DIW). The reactor was deoxygenated by passing a stream of nitrogen through it during the reaction. The reactor was ramped to 77° C. and the rpm was set to 400. Separately, in a 1 L glass vessel, equipped with two P4 impellers, a monomer emulsion was prepared by mixing (at 450 rpm) 319.5 g TFEMA, 6.5 g SLS surfactant (at 30% solids) and 416 g DIW together. A 37.1 g of seed was taken from the monomer emulsion and pumped into the 2 L reactor at 77° C. An initiator solution prepared from 1.22 g of ammonium persulfate in 34.3 g of DIW was added over 20 minutes after the seed emulsion addition. The remaining monomer emulsion was fed into the reactor over 120 min. Once half the monomer emulsion was added the rpm in the reactor was increased to 450 rpm. At the end of the monomer feed, the latex used a post-processing protocol of 1 hr at 77° C. followed by a 2 hr ramp to 87° C. and a 1 hr hold at 87° C. to reduce residual monomer at the end of the emulsion polymerization step. Following 25 micron sieving, the resultant latex containing 20% percent solids with a particle size of 100 nm was obtained.

Organic Additive 2: Synthesis of Fluorinated Organic Additive Latex (MD-TFEMA-03) with 0% DVB Same process and formulation as above (RR-TFEMA-02).

Organic Additive 3: Synthesis of Fluorinated Organic Additive Latex with DVB (RR-TFEMA-03)

Same as RR-TFEMA-02 except using 10% DVB and 90% TFEMA.

Organic Additive 4: Synthesis of Fluorinated Organic Additive Latex with DVB (RR-TFEMA-04)

Same as RR-TFEMA-02 except using 20% DVB and 80% TFEMA.

Organic Additive 5: Synthesis of Fluorinated Organic Additive Latex with DVB (RR-TFEMA-05)

Same as RR-TFEMA-02 except using 30% DVB and 70% TFEMA.

Organic Additive 6: Synthesis of Fluorinated Organic Additive Latex with Cyclohexylmethacrylate (CHMA) and DVB (RR-TFEMA-45).

Same as RR-TFEMA-02 except using 30% DVB, 35% TFEMA and 35% CHMA.

Organic Additive 7: Synthesis of Non-Fluorinated Organic Additive Latex with CHMA/25% DVB/0.8% Dimethylaminoethyl Methacrylate (DMAEMA)(OA1-50) Comparative Example 1

This is a standard latex made at 300-gal.

Organic Additive 8: Synthesis of Non-Fluorinated Organic Additive Latex with CHMA/25% DVB/0.8% DMAEMA (EP11-2P) Comparative Example 2

This is OA1 standard latex made at 3000-gal.

Organic Additive 9: Synthesis of Fluorinated Organic Additive Latex with DVB (RR-TFEMA-60) Comparative Example 3

This is a repeat of Organic Additive 5.

In all examples and comparative examples DVB has impurities so the actual DVB content is 55% of the amount added to the resin in all of the above examples and comparative examples. In tables below the amount of DVB added in the formulation is quoted, and also the actual content of DVB which is about 0.55×the added amount in the formulation. The bulk of the impurity in the DVB is ethyl vinyl benzene, which will also be incorporated into the polymer additive.

TABLE 1

| | | | | | |
|---|---|---|---|---|---|
| Fluorinated and non-fluorinated high C/O ratio latexes. | | | | | |
| Sample | Additive 1 | Additive 2 | Additive 3 | Additive 4 | Additive 5 |
| Formulation | 100% TFEMA / 0% DVB | TFEMA/ 100% 0% DVB | 90% TFEMA/ 10% DVB | 80% TFEMA/ 20% DVB | 70% TFEMA/ 30% DVB |
| SLS partition | (50/50)% | (50/50)% | (50/50)% | (50/50)% | (50/50)% |
| D50 [nm] | 100.6 | 106.4 | 70.4 | 65.4 | 95.7 |
| D95 [nm] | 147.4 | 147.7 | 107.4 | 98.7 | 182.45 |
| SD | 0.023 | 0.025 | 0.018 | 0.017 | 0.039 |
| Residual monomer TFEMA/ CHMA/DVB [ppm] | 714/NA | 411/NA | 75/0 | 9/0 | 7/0.8 |

| | Additive 6 | Comparative Example 1 | Comparative Example 2 | Comparative Example 3 |
|---|---|---|---|---|
| Sample | | | | |
| Formulation | 35% TFEMA/ 35% CHMA/ 30% DVB | 74.2%CHMA/ 25% DVB/ 0.8% DMAEMA | 74.2% CHMA / 25% DVB/ 0.8% DMAEMA | 70% TFEMA/ 30% DVB |
| SLS partition | (50/50)% | | | |
| D50 [nm] | (50/50)% | (14/86)% | (40/60)% | (50/50)% |
| D95 [nm] | 83.8 | 98 | 74 | 71 |
| SD | 121.8 | 134.2 | 109 | 100.6 |

TABLE 1-continued

| | | | | |
|---|---|---|---|---|
| Residual | 0.019 | 0.019 | 0.018 | 0.015 |
| monomer | ND/140/ND | 194/49 | 37/56 | nd/nd |
| TFEMA/ | | | | |
| CHMA/DVB | | | | |
| [ppm] | | | | | nd = not detected
Toner additive aging flattening testing

Xerox 700 Digital Color Press parent cyan Eco toner was blended with each additive alone on a lab SKM Mill at 28% SAC (surface area coverage), correcting for particle size and density of the additive. The general ideal formula for the % surface area coverage of spherical organic surface additive on a toner particle surface is given by $(100\% \cdot w \cdot D \cdot P)/(0.363 \cdot d = p)$, where for the toner D is the D50 average size in microns and P is the true density in grams/cm$^3$, and for the organic emulsion polymerized latex, d is the D50 average size in nanometers, p is the true density in grams/cm$^3$, and w is the weight added to the mixture in pph. The wt % loadings corresponding to 20% SAC are shown in Table 2.

TABLE 2

Additive loadings for toner blends for flattening testing

| Loading at same ~17% SAC as OA1 in Pinot K toner Additive | Density | Size | Loading | Comment |
|---|---|---|---|---|
| OA1 Target | 1.14 | 95 | 0.95 | Loading |
| Organic Additive 7 | 1.14 | 98 | 0.98 | Adjust |
| Organic Additive 1 | 1.47 | 101 | 1.30 | |
| Organic Additive 3 | 1.42 | 70 | 0.91 | |
| Organic Additive 4 | 1.38 | 65 | 0.84 | |
| Organic Additive 5 | 1.34 | 77 | 1.23 | |

For each toner, 30 g of FWC938 Pinot carrier was used along with 1.50 g of the blended toner in 60 mL glass bottles. This gave a toner concentration, or TC, of 5%. The samples were conditioned in J-zone, then were mixed on a Turbula mixer for a total of 2 hours, taking a sample for SEM at 15', 30', 1 h and 2 hr. The SEM images were inspected and if the organic polymeric additive was flattened and no longer spherical this was rated as a failure. The survival time was then the longest time that the particles remained spherical. Thus, if the particles were flattened at 2 h, the survival time was 1 h. As shown in FIG. 1, the survival time increased approximately linearly to about 25% to 30% DVB added. Since 120' minutes is the maximum time that a toner is expected to remain in a xerographic development housing, testing was not continued beyond 120 minutes.

For use as a toner additive, it was concluded that about 25% DVB is required for the fluorinated polymeric additives to be robust for xerographic applications, which was the same conclusion reached previously for the OA1 CHMA/DVB organic additive. This data shows that both TFEMA based fluorinated latex and CHMA based latex have similar requirements for excellent toner aging performance, with at least 25% DVB input.

TABLE 3

Survival time to flattening

| ID | Matrix Monomer | CCA Monomer | Input DVB | SEM Survival Time to Flatten (min) | Comment |
|---|---|---|---|---|---|
| Additive 3 | TFEMA | None | 0% | 0 | Flattened at 15' |
| Additive 4 | TFEMA | None | 20% | 60 | Some flattening at 120' |
| Additive 5 | TFEMA | None | 30% | 120 | No flattening test end |
| Comparative Example 1 | CHMA | DMAEMA | 25% | 120 | No flattening test end |

Additive blends for developer performance evaluation.

Toner blend compositions for developer performance evaluation are shown in Table 4. Toner Blend Comparative Examples 1 and 2 were blended on a 10-L Henschel mixer with the TCIT package, using Xerox 700 (Pinot) black and cyan parent toner respectively. These two samples show examples of the current reference toner performance. Toner Blend Comparative Examples 3 through 6 were all blended at lab scale, as described for the toner blends for flattening performance, and all were about 100% additive SAC coverage of the additives shown in the table and listed below, using the Pinot cyan toner. Toner Blend Comparative Example 3 was blended with RX50 HMDS treated silica only as a reference. Toner Blend Comparative Examples 4, 5 and 6 were blended with only Organic Additive 5, Organic Additive 6, and with Organic Additive 7, respectively. Toner Blend Example 1 was blended on the Pinot K toner, in this case with a mixture of Organic Additive 8 and Organic Additive 9, and for cleaning performance for a potential machine test, with 0.14 pph strontium titanate and 0.09 pph ZnSt.

Figure 2:
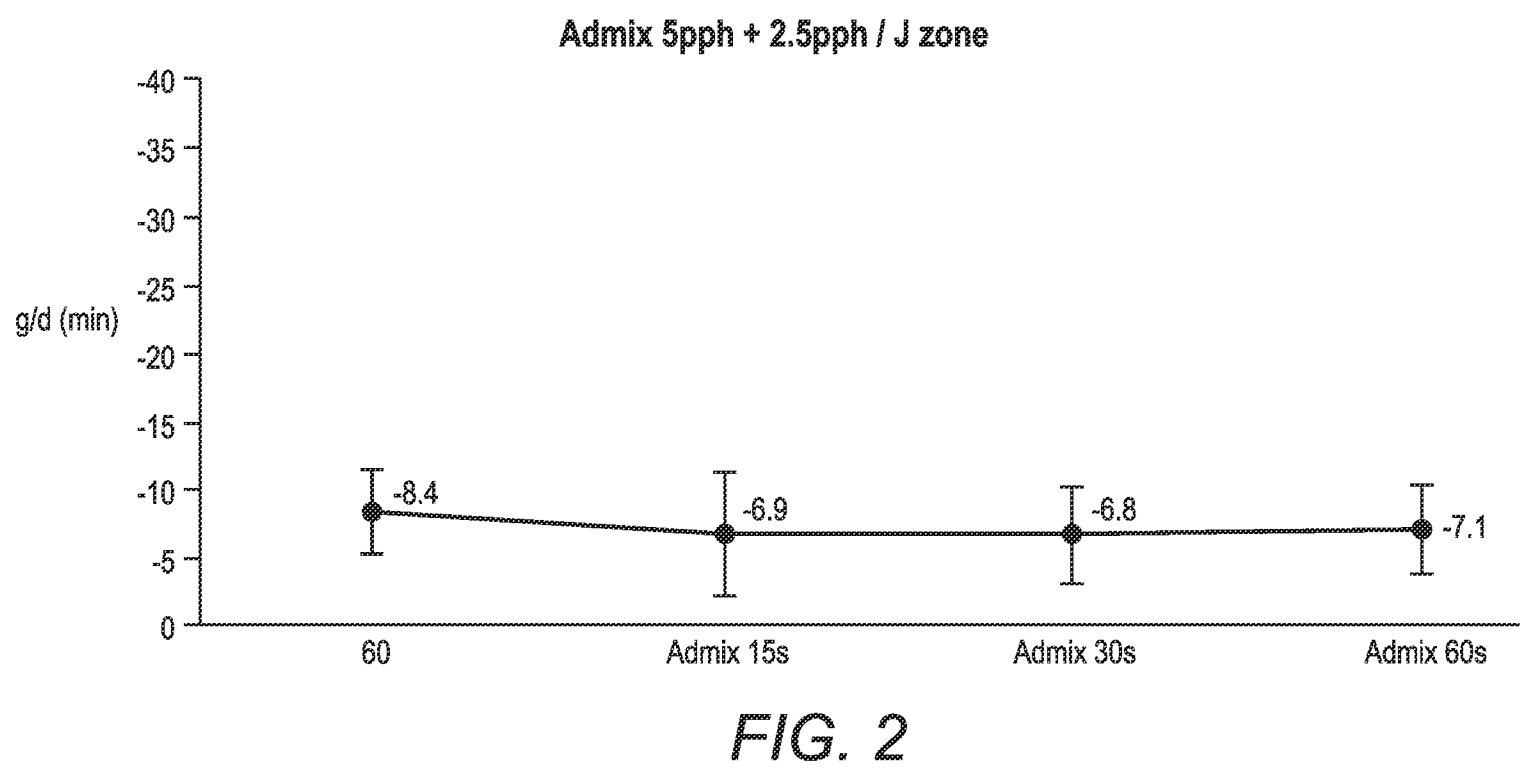

For charging evaluation, for each toner, 30 g of Xerox 700 carrier was used along with 1.50 g of the blended toner in 60 mL glass bottles. This gave a toner concentration, or TC, of 5 pph. Samples were conditioned three days in a low-humidity zone (J zone) at 21.1° C. and 10% RH), and in a separate sample in a high humidity zone (A zone) at about 28° C./85% relative humidity. The developers with were charged in a Turbula mixer for 60 minutes. Then toner Q/M was measured by blow-off. For the admix experiment, a developer sample was prepared and condition in J-zone, and charged on the Turbula for 60 minutes. The Q/D trace was measured, then a further 0.75 grams of J-zone conditioned toner was added to the developer, or 2.5 pph. The developer was further mixed 15 seconds on the Turbula and Q/D remeasured. The developer was then further mixed for another 15 seconds for another Q/D measurement, and finally for another 30 seconds (60 seconds total mixing) and Q/D measured again. This is shown in FIG. 2.

TABLE 4

| Example # | | Target range | Toner Blend Comp. Ex. 1 | Toner Blend Comp Ex. 2 | RX50 Toner Blend Comp Ex. 3 | OA 5 Toner Blend Comp. Ex. 4 | OA6 Toner Blend Comp. Ex. 5 | OA7 Toner Blend Comp. Ex. 6 | OA9 + OA8 Toner Blend Example 1 | |
|---|---|---|---|---|---|---|---|---|---|---|
| Parent Toner | | | Black | Cyan | Cyan | Cyan | Cyan | Cyan | Black | |
| Additive Formulation | Additive Type | | TCIT | TCIT | RX50 Silica | 70% TFEMA/ 30% DVB | 35% TFEMA/ 35% CHMA/ 30% DVB | 74.2% CHMA/ 25% DVB/ 0.8% DMAEMA | 70% TFEMA/30% DVB + CHMA/25% DVB/0.8% DMAEMA | |
| | wt % | | | | 4.4 | 5.6 | 5.4 | 5.6 | 2.2 | 2.2 |
| | Size (nm) | | | | 40 | 76 | 84 | 98 | 71 | 74 |
| | Density | | | | 2.2 | 1.34 | 1.21 | 1.1 | 1.34 | 1.1 |
| | % SAC | | 72 | 72 | 100 | 110 | 106 | 104 | 46 | 54 |
| Performance Evaluation | Az Q/M | −20 | −26 | −31 | −22 | −82 | −20 | 3 | −30 | |
| | Jz Q/M | −60 | −45 | −56 | −63 | −111 | −73 | 6 | −39 | |
| | $\frac{Az}{Jz}$ | ≥0.50 | 0.58 | 0.55 | 0.35 | 0.74 | 0.27 | 0.50 | 0.77 | |
| | Cohesion (%) | 15 to 40 | 15 | 23 | 11 | 8 | 14 | 21 | 29 | |
| | Blocking (° C.) | >51 | 53.1 | 52.1 | 55.7 | 57.0 | 53.1 | 54.0 | 54.4 | |

Toner Blend Comparative Example 3 uses RX50 silica, which is a typical Toner Blend Comparative Example 3 uses RX50 silica, which is a typical medium size silica toner additive included here as a reference. The charge is very good and negative in J-zone, but it is very RH sensitive: A-zone is only a ratio of 0.35 of the value in J-zone, so A-zone only retains 3500 of the J-zone charge. Thus, silica alone is an unacceptable additive design, though it does provide very good low cohesion, indicating good flow, and very good blocking onset temperature.

Toner Blend Comparative Example 6 uses a high C/O ratio non-fluorinated organic additive with CHMA as the base polymer resin cross-linked with DVB, and with 0.8% DMAEMA as a positive charge control agent. Charge is very low so in not acceptable. Flow cohesion is acceptable and blocking is good, though not as good as silica.

Toner Blend Comp. Ex. 4 uses a fluorinated TFEMA/polymeric organic additive is very negatively charging, nearly double the J-zone charge of silica, and nearly 4 times the A-zone charge. Despite the very high negative charge, the RH ratio is very good, maintaining 75% of the charge from J-zone into A-zone. Further, the flow is slightly better than the RX50, and blocking as well is considerably improved. Clearly, however the charge is too high to be used as a silica or titania replacement.

Toner Blend Comp. Ex. 5 uses an organic additive that is a 1:1 copolymer of 35% TFEMA and 35% CHMA, cross-linked with 30% DVB., so a 1:1 copolymer of those two monomers by weight. Overall the charge is similar to RX50 in both A and J-zone, and with similar flow cohesion. However, the RH ratio is worse than RX50 silica, and nowhere near the 0.5 ratio needed for a functional developer, which would be required to replace titania for example. The blocking is acceptable, similar to or a little better. The RH ratio is still very high and would require addition of titania or some other additive to improve the RH performance.

A feature of the disclosure herein is to provide an additive design that uses two latexes, one with a fluorinated copolymer and one with a non-fluorinated copolymer that has a high C/O ratio. In Table 4, Toner Blend Example 1 shows a toner blend with a 70% TFEMA/30% DVB latex and with a 74.5% CHMA/25% DVB/0.8% DMAEMA latex. In this example they are mixed in a 1:1 weight ratio (SAC ratio is 44:56 fluorinated to non-fluorinated). Surprisingly, compared to the single latex that is 1:1 with TFEMA/CHMA, the 1:1 mixture of two latexes performs much differently and much better. The charge level of this combination is in the middle of the desired charge range target, and the RH ratio is much better than it is in any of the other comparative examples. The blocking is also improved 1.3° C. compared to the 1:1 mixed latex, and is much better than the control toners. Flow cohesion is slightly worse, but remains in the target range. Thus, the mixture of two latexes could replace both silica and titania in the current additive design package. As further verification of the performance, an admix experiment was completed. Surprisingly, the admix was nearly perfect. There was only a slight broadening of the distributions at 15 seconds, indicating a very slight slow admix. This was surprising as compared to silica, organic additives have typically given somewhat worse admix. Also, developers without titania generally have slow admix, which has made it very problematic in other work to replace titania.

Functional additive design range for mixtures of non-fluorinated and fluorinated organic polymer latex.

Figure 3:
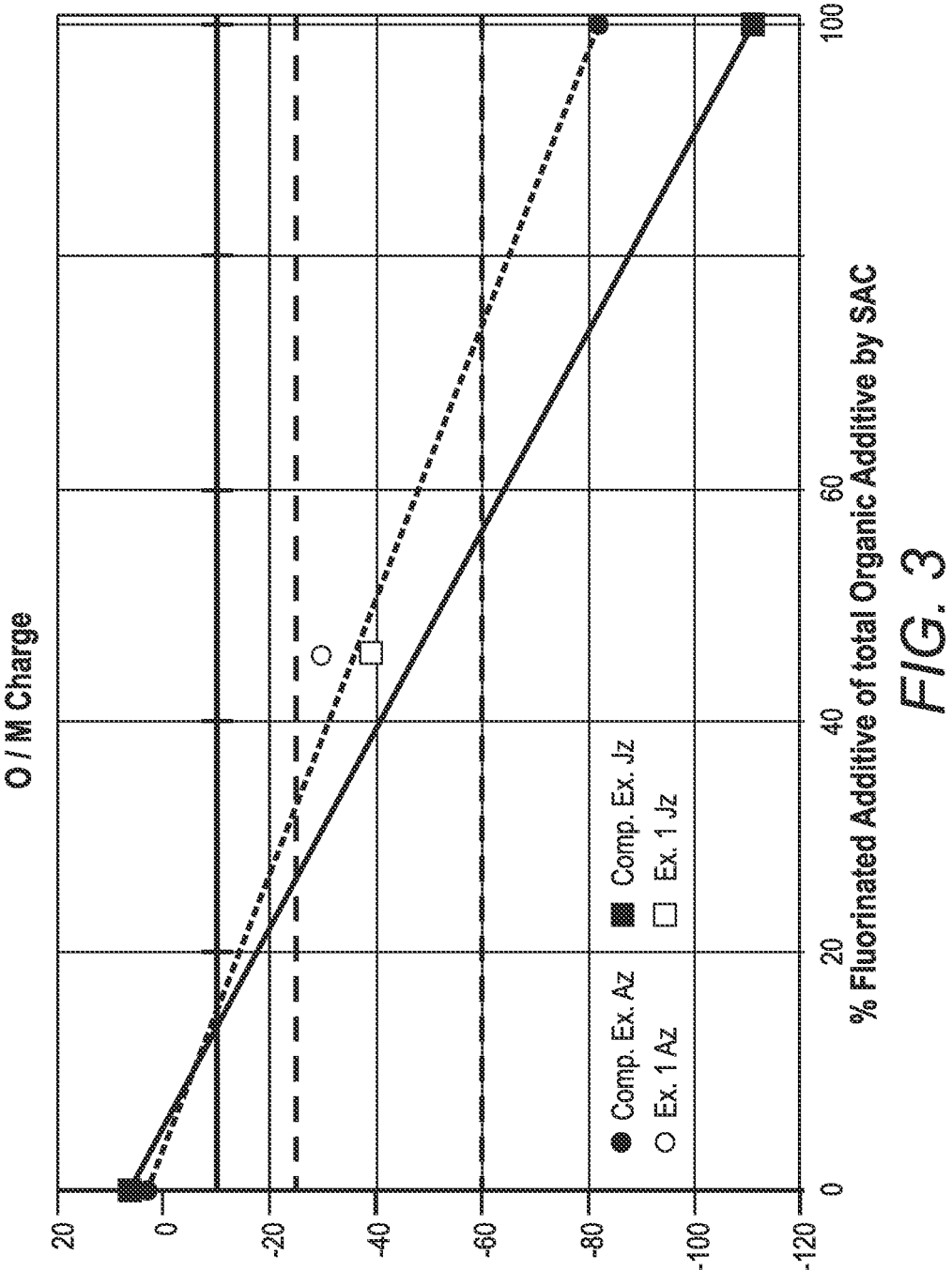
FIG. 3 shows a comparison of charge per particle versus percent of fluorinated additive according to various embodiments disclosed herein.

From data in the Table 3 and 4 above, the TFEMA crosslinked latex alone, the high C/O ratio crosslinked latex alone, and the mixture of the two, all have flow cohesion in the current functional range. They also all have blocking in the current functional range. Thus, from those two performance perspectives we can predict that any combination of those two organic additives would also be functional for flow and blocking. However, clearly neither the TFEMA latex or the high C/O ratio fluorinated latex have a functional triboelectric charge. The graph in FIG. 3 plots the charge on the toners with either TFEMA fluorinated latex (Toner Blend Comp. Ex. 4), or the high C/O ratio non-fluorinated CHMA latex (Toner Blend Comp. Ex. 6) as blended on the cyan toner for A-zone and J-zone. Also shown is a linear interpolation between the two values in each zone, representing an additive relationship for the charge. Similarly, the mixture of the two latexes (Toner Blend Example 1) is plotted as 44% TFEMA by SAC, and shows the charge on the black toner. Note all the % are based on SAC, not weight % in this plot. While there were differences in the blend protocol and in the color of the parent toner, the charge results for the inventive mixture of the two latexes are very close to the simple additive prediction of the two individual latexes on the cyan toner. Thus, we can use the graph to define an approximate functional range for the mixture of the fluorinated and non-fluorinated latexes high C/O ratio latexes. To do this, the acceptable triboelectric charge range was added to the graph, showing acceptable charge between about –20 and –60 microcoulombs/gram. Using the interpolated line, this corresponds to % SAC of the fluorinated additive compared to the total of fluorinated and non-fluorinated additive of about 30% to about 60%, where both A-zone and J-zone are within the functional range. As can be seen by the graph, the RH sensitivity of all of these designs will be very good, above 0.5%. If the non-fluorinated CHMA latex did not contain DMAEMA then charge in A-zone might increase at most 5 units. This would slightly lower the possible range of fluorinated additive to about 25% SAC of the total organic additive.

The present disclosure provides a toner additive that replaces both the middle silica, titania and as well, a large silica (like X24). It is desirable that they are both equal or larger than about 30 nm (X24-30 is 30 nm, RX50 and RY50 middle silica are 40 nm, JMT2000 titania is 15×15×40 nm, STT100H titania is 40 nm) and both are less than or equal to about 115 nm (X25 is 115 nm). Smaller particle sizes will age poorly in the developer housing, being impacted into the toner, and will not provide as good a blocking. Larger additives will have poor toner flow.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims

What is claimed is:

1. A toner composition comprising: toner particles comprising at least one resin, an optional colorant, an optional wax, and a polymeric toner additive on at least a portion of an external surface of the toner particles, the polymeric toner additive comprising:

a first polymeric resin comprising a cross-linked fluorinated acrylic monomer, a cross-linkable monomer comprising divinyl benzene at 30 wt % of the first polymeric resin, and a fluorinated divinyl crosslinking agent, wherein the first polymeric resin has an average or medium particle size (D50) of from about 20 nanometers to about 40 nanometers;

a second polymeric resin comprising cyclohexylmethacrylate (CHMA), divinyl benzene at 25 wt % of the second polymeric resin, and a charge control agent comprising a nitrogen containing group at 0.1 wt % to 1.5 wt % of the second polymeric resin, wherein the second polymeric resin has an average or medium particle size (D50) of from about 71 nanometers to about 115 nanometers; and wherein the charge control agent comprises dipropylaminoethyl methacrylate, diisopropylaminoethyl methacrylate, dibutylaminoethyl methacrylate, or a combination thereof; and wherein the toner composition comprises no titania.

2. The toner composition of claim 1, wherein the fluorinated acrylic monomer comprises a fluorinated acrylate monomer or fluorinated methacrylate monomer.

3. The toner composition of claim 1, wherein the second polymeric resin comprises a non-fluorinated hydrophobic monomer.

4. The toner composition of claim 1, wherein the toner particles comprise an emulsion aggregation toner having a size from about 4 microns to about 10 microns.

5. The toner composition of claim 1, further comprising a cleaning additive selected from the group consisting of: stearates, cerium oxide, and strontium titanate.

6. The toner composition of claim 1, wherein the polymeric toner additive comprises from 0.1 weight percent to 5 weight percent of the toner composition.

7. A developer comprising: a toner composition; and a toner carrier, wherein the toner composition comprising: toner particles comprising at least one resin, an optional colorant, an optional wax, and a polymeric toner additive on at least a portion of an external surface of the toner particles, the polymeric toner additive comprising:

a first polymeric resin comprising a cross-linked fluorinated acrylic monomer, a cross-linkable monomer comprising divinyl benzene at 30 wt % of the first polymeric resin, and a fluorinated divinyl crosslinking agent, wherein the first polymeric resin has an average or medium particle size (D50) of from about 20 nanometers to about 40 nanometers;

a second polymeric resin comprising cyclohexylmethacrylate (CHMA), divinyl benzene at 25 wt % of the second polymeric resin, and a charge control agent comprising a nitrogen containing group at 0.1 wt % to 1.5 wt % of the second polymeric resin, wherein the second polymeric resin has an average or medium particle size (D50) of from about 71 nanometers to about 115 nanometers; and wherein the charge control agent comprises dipropylaminoethyl methacrylate, diisopropylaminoethyl methacrylate, dibutylaminoethyl methacrylate, or a combination thereof; and wherein the toner composition comprises no titania.

8. The developer of claim 7, wherein the fluorinated acrylic monomer comprises a fluorinated acrylate monomer or fluorinated methacrylate monomer.

9. The developer of claim 7, wherein the second polymeric resin comprises a non-fluorinated hydrophobic monomer.

10. The developer of claim 7, further comprising an additive selected from the group of silica, and alumina.

11. A toner additive comprising:

a first polymeric resin comprising a cross-linked fluorinated acrylic monomer, a cross-linkable monomer comprising divinyl benzene at 30 wt % of the first polymeric resin, and a fluorinated divinyl crosslinking agent, wherein the first polymeric resin has an average or medium particle size (D50) of from about 20 nanometers to about 40 nanometers;

a second polymeric resin comprising cyclohexylmethacrylate (CHMA), divinyl benzene at 25 wt % of the second polymeric resin, and a charge control agent comprising a nitrogen containing group at 0.1 wt % to 1.5 wt % of the second polymeric resin, wherein the second polymeric resin has an average or medium particle size (D50) of from about 71 nanometers to about 115 nanometers; and wherein the charge control agent comprises dipropylami-
noethyl methacrylate, diisopropylaminoethyl meth-
acrylate, dibutylaminoethyl methacrylate, or a combi-
nation thereof; and wherein the toner additive comprises no titania.

12. The toner additive of claim 11, wherein the fluorinated acrylic monomer comprises a fluorinated acrylate monomer or fluorinated methacrylate monomer.

13. The toner additive of claim 11, wherein the second polymeric resin comprises a non-fluorinated hydrophobic monomer.

* * * * *